June 12, 1934.   H. T. SEELEY   1,962,942
PRIME MOVER DYNAMO ELECTRIC PLANT
Filed June 1, 1931
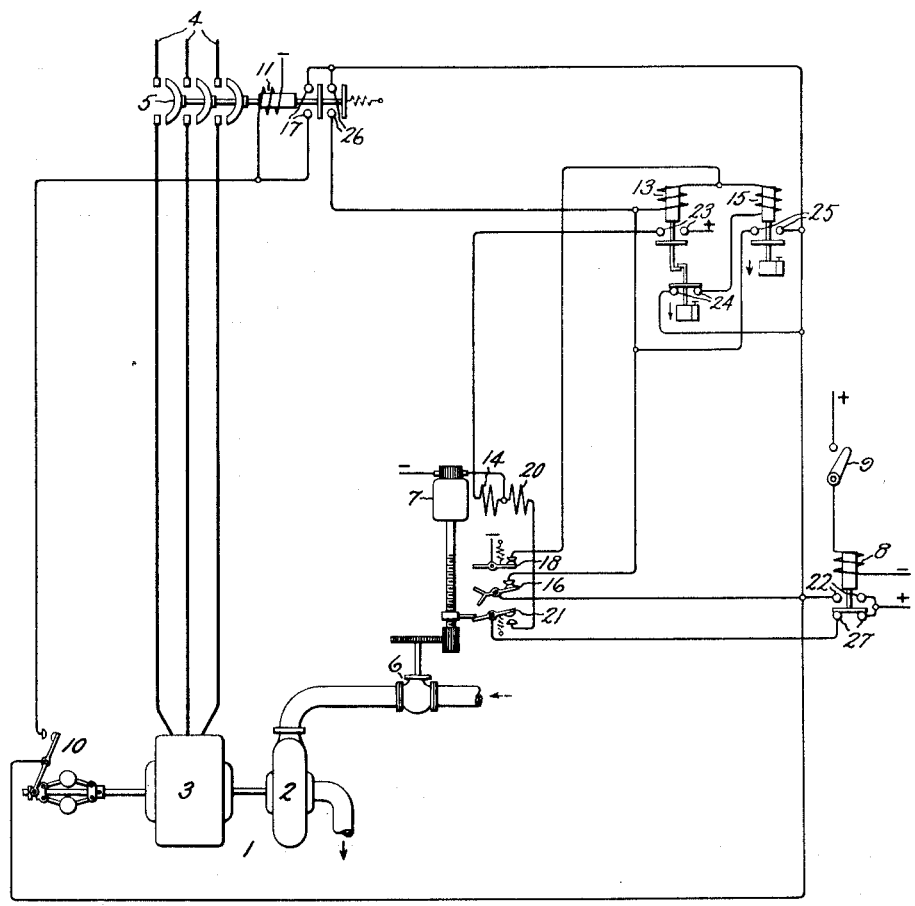
Inventor:
Harold T. Seeley,
by Charles E. Mullen
His Attorney.

UNITED STATES PATENT OFFICE 1,962,942

PRIME MOVER DYNAMO-ELECTRIC PLANT

Harold T. Seeley, Yeadon, Pa., assignor to General Electric Company, a corporation of New York Application June 1, 1931, Serial No. 541,314

7 Claims. (Cl. 137—158)

My invention relates to prime mover dynamo-electric plants, and particularly to such a plant which is provided with a motor operated gate for controlling the supply of fluid to the prime mover, and its object is to provide an improved arrangement for starting such a plant.

In accordance with my invention, I provide an arrangement for controlling the gate motor in such a manner that when the plant is started, the gate is opened at a relatively high speed until it has been opened an amount sufficient to start the prime mover rotating. Then the gate motor is operated in such a manner that the gate is opened at a much lower speed until the plant is in a predetermined operative condition such as being connected to the load circuit supplied by the plant. Then the gate motor is operated in such a manner that the gate is again opened at a relatively high speed until it reaches its normal opening.

My invention will be better understood from the following description when taken in connection with the accompanying drawing, which shows diagrammatically a control system for prime mover dynamo-electric plants embodying my invention, and its scope will be pointed out in the appended claims.

Referring to the drawing, 1 represents a prime mover dynamo-electric plant comprising a water wheel 2 driving an alternating current generator 3 which is arranged to be connected to an alternating current load circuit 4 by means of a suitable switching arrangement such as a circuit breaker 5. The supply of water to the water wheel 2 is controlled by means of a gate 6, the opening and closing of which may be effected by any suitable means, examples of which are well known in the art. As shown in the drawing, a reversible electric motor 7 is provided for opening and closing the gate 6.

Any suitable control arrangement, examples of which are well known in the art, may be provided for effecting the starting and stopping of the dynamo-electric plant 1. As shown, I have provided a master relay 8 which is so arranged that when it is energized, it effects the starting of the plant 1 and when it is deenergized, it effects the shutting down of the plant. A manually controlled switch 9 is provided for controlling the energization of the master relay 8. In order that the generator 3 may be automatically connected to the load circuit 4 after the plant 1 has been started, a suitable speed responsive device 10 is provided which is arranged to complete an energizing circuit for a closing coil 11 for the circuit breaker 5 when the speed of the prime mover 2 of the plant 1 is above a predetermined value.

For controlling the opening of the gate 6 during the starting of the plant 1, I provide, in accordance with my invention, an arragement whereby the motor 7 is operated at a relatively high speed until the gate has been opened an amount which will start the prime mover 2 rotating. Then the motor 7 is operated at a lower speed until the speed of the prime mover 2 has reached a value which causes the speed responsive means 10 to effect the closing of the circuit breaker 5. Then the motor 7 is again operated at a relatively high speed to complete the opening operation of the gate 6. In the embodiment of my invention shown in the drawing, I accomplish this result by providing a control relay 13 which is arranged to be continuously energized in response to the energization of the master relay 8 when the gate opening is less than a predetermined amount so that a limit switch 16, associated with the gate 6, is closed. The relay 13, when energized, completes a circuit for the armature and field winding 14 of the gate motor 7 so that the motor armature rotates in a direction to effect the opening of the gate 6.

After the gate 6 has been opened an amount sufficient to effect the opening of the gate limit switch 16, an energizing circuit for the relay 13 is arranged to be completed intermittently by means of a time relay 15, the circuit of which is arranged to be completed by the relay 13 when it is deenergized. The relay 15 is arranged in any suitable manner so that it does not open its contacts 25 until after the operating winding has been deenergized for a predetermined time. The relay 13 is similarly arranged so that it does not close its contacts 24 until after the operating winding has been deenergized for a predetermined time. It however opens its contacts 23 immediately after the operating winding is deenergized. Therefore, when the relay 15 is deenergized, it maintains the circuit of the relay 13 closed for a predetermined time. In a similar manner, the energizing circuit of the relay 15 is not again established until a predetermined time after the relay 13 is deenergized by the relay 15 opening its contacts.

In order to effect the opening of the gate 6 at the relatively high speed after the circuit breaker 5 is closed, the circuit breaker is provided with auxiliary contacts 26 which are closed when the circuit breaker is closed and which complete an energizing circuit for the control relay 13 independently of the contacts of the time relay 15.

The energizing circuits for the relay 13 also include the gate limit switch 18, which is arranged to be opened in any suitable manner when the gate has been opened a predetermined amount.

In order to close the gate when it is desired to shut down the plant 1, the motor 7 is provided with a field winding 20, the circuit of which is arranged to be completed by the master relay 8 when it is deenergized. The circuit of the winding 20 also includes the motor armature and the gate limit switch 21 which is closed until the gate reaches its closed position. When the armature and field winding 20 of the motor 7 are energized, the motor armature rotates in a direction to effect the closing of the gate 6.

The operation of the arrangement shown in the drawing is as follows:

When it is desired to start the plant 1, the manually controlled switch 9 is closed so as to complete an energizing circuit for the master relay 8. The relay 8 by closing its contacts 22 completes, through the gate limit switches 16 and 18, an energizing circuit for the control relay 13. The relay 13 by closing its contacts 23 completes a circuit through the field winding 14 and the armature of the motor 7 so that the motor is operated in a direction to effect the opening of the gate 6. When the gate 6 has been opened an amount sufficient to effect the starting of the prime mover 2, the gate limit switch 16 is opened to effect the deenergization of the relay 13. Since the relay 13 is continuously energized until the gate limit switch 16 is opened, the initial opening movement of the gate 6 takes place at a relatively high speed.

When the relay 13 is deenergized, the opening of its contacts 23 interrupts the circuit of the motor 7. By closing its contacts 24, the relay 13 completes, through the contacts 22 of the master relay 8 and the gate limit switch 18, an energizing circuit for the time relay 15. The relay 15, in turn, completes, through its contacts 25, the contacts 22 of the master relay 8 and the gate limit switch 18, an energizing circuit for the controlled relay 13. The relay 13 by closing its contacts 23 again establishes the opening circuit for the motor 7 and by opening its contacts 24 interrupts the above-traced circuit for the time relay 15. After a predetermined time, the relay 15, by opening its contacts 25, interrupts the above-traced circuit for the relay 13 which immediately opens its contacts 23 and after a predetermined time closes its contacts 24 so that the above-traced circuit for the time relay 15 is again completed. In this manner, the motor 7 is intermittently energized to effect the opening of the gate 6 at a relatively low average speed after the gate limit switch 16 has been opened.

The gate 6 is gradually opened in this manner until the speed of the plant 1 reaches a value sufficient to cause the speed responsive means 10 to close its contacts and complete, through the contacts 22 of the master relay 8, an energizing circuit for the closing coil 11 of the circuit breaker 5 so that the generator 3 is connected to the load circuit 4. The circuit breaker 5, by closing its auxiliary contacts 17, completes a locking circuit for its closing coil 11 which is independent of the contacts of the speed responsive means 10. Also by closing its auxiliary contacts 26, the circuit breaker 5 completes, through the contacts 22 of the master relay 8 and the gate limit switch 18, an energizing circuit for the relay 13 so that the relay 13 remains continuously energized until the gate has been opened a predetermined amount when the gate limit switch 18 is opened. Therefore, after the circuit breaker 5 is closed, the remaining portion of the gate opening operation takes place at a relatively high speed.

When it is desired to shut down the plant 1, the manually controlled switch 9 is opened to effect the deenergization of the master relay 8. The relay 8 by opening its contacts 22, interrupts the above-traced circuit for the closing coil 11 so that the circuit breaker 5 will open to disconnect the generator 3 from the load circuit 4. By closing its contacts 27, the master relay 8 completes, through the limit switch 21, an energizing circuit for the field winding 20 and the armature of the motor 7 so that the motor 7 is operated to effect the closing of the gate 6.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States is:

1. In a dynamo-electric plant, the combination of a prime mover, a gate for the prime mover, an electric motor directly connected to said gate for opening it to start said plant, a set of contacts, means for effecting the operation of said contacts when said gate is opened a predetermined amount, and means including said contacts for effecting the operation of said motor during the starting of said plant at a relatively high speed until said gate has opened sufficiently to effect the operation of said set of contacts and at a relatively low speed after said operation of said set of contacts.

2. In a dynamo-electric plant, the combination of a prime mover, a gate for the prime mover, an electric motor directly connected to said gate for opening it to start said plant, a set of contacts, means for effecting the operation of said contacts when said gate is opened a predetermined amount, and means including said contacts for continuously energizing said motor during the starting of said plant until said gate has opened sufficiently to effect the operation of said contacts and for intermittently energizing said motor after said operation of said set of contacts.

3. In a dynamo-electric plant, the combination of a prime mover, a gate for the prime mover, an electric motor directly connected to said gate for opening it to start said plant, a circuit for said motor, a relay arranged when energized to complete said motor circuit, a circuit for said relay, a set of contacts in said relay circuit, means for intermittently opening and closing said set of contacts, a second set of normally closed contacts connected in parallel with said first mentioned set of contacts and means for effecting the operation of said second set of contacts when said gate is opened a predetermined amount whereby said motor is energized continuously during the starting operation of said plant until said gate is opened sufficiently to effect the opening of said second set of contacts and is intermittently energized thereafter.

4. In a dynamo-electric plant, the combination of a prime mover, a gate for the prime mover, an electric motor directly connected to said gate for opening it to start said plant, two sets of contacts, means for effecting the operation of one set of contacts when said gate is opened a predetermined amount, means for effecting the operation of the other set of contacts when said gate is opened a second predetermined amount, means including said one set of contacts for effecting the operation of said motor during the starting of said plant at a relatively high speed until said gate has been opened sufficiently to effect the operation of said one set of contacts and at a relatively low speed after said operation of said one set of contacts, means responsive to a predetermined operative condition of said plant after said operation of said one set of contacts for effecting the operation of said motor at a relatively high speed, and means controlled by said second set of contacts for stopping the opening operation of said motor when said gate has been opened said second predetermined amount.

5. In a dynamo-electric plant, the combination of a prime mover, a gate for the prime mover, an electric motor directly connected to said gate for opening it to start said plant, two sets of contacts, means for effecting the operation of one set of contacts when said gate is opened a predetermined amount, means for effecting the operation of the other set of contacts when said gate is opened a second predetermined amount, means including said one set of contacts for effecting the continuous energization of said motor during the starting operation of said plant until said gate has been opened sufficiently to effect the operation of said one set of contacts and the intermittent energization of said motor after said operation of said one set of contacts, means responsive to a predetermined operative condition of said plant after said operation of said one set of contacts for effecting the continuous energization of said motor, and means controlled by said second set of contacts for stopping the opening operation of said motor by effecting the deenergization of said motor when said gate has been opened said second predetermined amount.

6. In a dynamo-electric plant, the combination of a prime mover, a gate for the prime mover, an electric motor directly connected to said gate for opening it to start said plant, two sets of contacts, means for effecting the operation of one set of contacts when said gate is opened a predetermined amount, means for effecting the operation of the other set of contacts when said gate is opened a second predetermined amount, means including said one set of contacts for effecting the operation of said motor during the starting of said plant at a relatively high speed until said gate has been opened sufficiently to effect the operation of said one set of contacts and at a relatively low speed after said operation of said one set of contacts, means responsive to the speed of said prime mover after said operation of said one set of contacts for effecting the operation of said motor at a relatively high speed, and means controlled by said second set of contacts for stopping the opening operation of said motor when said gate has been opened said second predetermined amount.

7. In a dynamo-electric plant, the combination of a prime mover, a gate for the prime mover, an electric motor directly connected to said gate for opening it to start said plant, a circuit for said motor, a relay arranged when energized to complete said motor circuit, a circuit for said relay, a set of contacts in said relay circuit, means for intermittently opening and closing said set of contacts, a second set of normally closed contacts connected in parallel with said first mentioned set of contacts, means for effecting the opening of said second set of contacts when said gate is opened a predetermined amount, a third set of normally closed contacts connected in series with said pair of parallel-connected sets of contacts, means for effecting the opening of said third set of normally closed contacts when said gate is opened a second predetermined amount, a fourth set of normally open contacts connected in parallel with said first mentioned set of contacts, and means responsive to a predetermined speed of said prime mover for effecting the closing of said fourth set of contacts.

HAROLD T. SEELEY.